United States Patent [19]

Ichikawa

[11] Patent Number: 4,714,402
[45] Date of Patent: Dec. 22, 1987

[54] MECHANISM FOR ACTUATING DEFLECTOR OF PELTON WHEEL

[75] Inventor: Kentaro Ichikawa, Chigasaki, Japan

[73] Assignee: Kabushiki Kaisha Toshiba, Kawasaki, Japan

[21] Appl. No.: 908,308

[22] Filed: Sep. 17, 1986

[30] Foreign Application Priority Data

Sep. 18, 1985 [JP] Japan ................................ 60-206056

[51] Int. Cl.$^4$ ............................................. F04D 15/02
[52] U.S. Cl. ................................................... 415/35
[58] Field of Search ................. 415/35, 202, 148, 150, 415/157

[56] References Cited

U.S. PATENT DOCUMENTS

| 1,706,812 | 3/1929 | Pfau | 415/35 |
| 2,491,059 | 12/1949 | Ring | 415/35 |
| 2,701,706 | 2/1955 | Bon | 415/35 |
| 3,275,008 | 9/1966 | Kerensky | 415/35 |

FOREIGN PATENT DOCUMENTS

| 59966 | 8/1922 | Austria | 415/35 |
| 73135 | 3/1922 | Switzerland | 415/35 |

OTHER PUBLICATIONS

Fuji Jiho, vol. 55, No. 5, 1982, p. 30.

Primary Examiner—Robert E. Garrett
Assistant Examiner—John T. Kwon
Attorney, Agent, or Firm—Schwartz, Jeffery, Schwaab, Mack, Blumenthal & Evans

[57] ABSTRACT

One end of an operating rod is connected to a deflector arm which causes a jet deflector of a Pelton wheel to open or close while the other end of the operating rod carries a spring bearing plate which is disposed in the bore of a cylinder which is movable in the axial direction of the operating rod. A spring is accommodated in the bore of the cylinder on the side of the operating rod. One end of the cylinder is pin connected to the midpoint between the ends of a swinging lever whose one end is pivotally supported and whose other end is connected to an electric servomotor so that upon energization of the servomotor, the swinging lever is caused to undergo a reciprocal angular motion. The deflector is forced to move to its full closure position by the release of the energy stored in the spring.

8 Claims, 8 Drawing Figures

MECHANISM FOR ACTUATING DEFLECTOR OF PELTON WHEEL

BACKGROUND OF THE INVENTION

1. Field of the Invention

The present invention relates to a mechanism for actuating a deflector of a Pelton wheel (turine or unit) and more particularly to such a mechanism of the type in which an electric servomotor is used to maintain the deflector in its opened position, and the stored energy of a spring is used to close the deflector.

2. Description of the Prior Art

A Pelton wheel is of a type of impulse turbine and is usually operated from a high-head source ranging from 200 to 1,800 meters when the volume of water available is relatively small. The water under pressure which is introduced into the casing of the Pelton wheel is accelerated when it is forced to flow through a nozzle and then the resulting high-velocity jet impinges on the buckets of the turbine wheel or runner, whereby the runner is rotated. A deflector is disposed at the discharge end of the nozzle pipe so that in the case of an emergency, the high-velocity jet emerging from the nozzle is deflected and thereby prevented from impinging on the buckets of the runner. A mechanism which uses a fluid operated servomotor for opening and closing the deflector has been well known in the art, but the fluid operated servomotor needs not only a source for supplying oil under pressure but also a device for controlling the pressure of the working oil so that there arises the problem of such associated or auxiliary equipment becoming complicated in construction and large in size for the output of the Pelton wheel. In addition, in the case of a system in which a fluid operated servomotor is activated to push an operating rod to close the deflector, there arises a problem in that a large force due to high hydraulic pressure acts on the rod in its axial direction, causing buckling of the operating rod.

In order to solve the above described problems, there has been proposed a system in which a fluid operated servomotor is combined with a coiled spring so that the deflector is moved to and maintained at the opened position by the fluid operated servomotor and, in the case of an emergency, the operating rod is actuated by the force of the coiled spring, thereby closing the deflector (Fuji Jiho, Vol. 55, No. 5, Page 30, published in 1982). However, according to the above-described prior art system, the force of the coiled spring is exerted on the operating rod in the direction in which the operating rod is compressed, so that there arises the problem of unavoidable buckling of the operating rod.

SUMMARY OF THE INVENTION

In view of the above, the primary object of the present invention is to provide a mechanism for actuating a deflector of a Pelton wheel which can substantially overcome the above and other problems encountered in the prior art deflector actuating mechanism, and which, in the case of an emergency, exerts tensile strength on a deflector operating rod from a spring, thereby closing the deflector.

To the above and other ends, a mechanism for actuating a deflector of a Pelton wheel in accordance with the present invention comprises a deflector arm for rotating the deflector, an operating rod whose one end is pin connected to said deflector arm and whose other end carries a spring bearing plate, a cylinder which accommodates said spring bearing plate therein and which is guided for movement in the axial direction of said operating rod, spring means which is accommodated in the bore of the cylinder on the side of the operating rod and whose stored energy pulls the operating rod, a swinging lever whose one end is pivotally supported and whose midpoint is pin connected to one end of the cylinder, an electric servomotor connected to the free end of said swinging lever so as to cause reciprocable angular movement of the swinging lever, first engaging means engageable with the free end of the swinging lever, thereby maintaining the swinging lever stationary, and second engaging means for maintaining the deflector arm in the fully opened position.

According to the present invention, when the deflector is moved to the full closure position, the force of the spring means is exerted on the operating rod as a pulling force. That is, no spring force is exerted to push the operating rod so that the operating rod is prevented from buckling. The operating end of the output rod of an electric servomotor acts on the outer end of the swinging lever, whereby less force is required to balance the force of the spring means because of lever action.

The above and other objects, effects, features and advantages of the present invention will become more apparent from the following description of a preferred embodiment thereof when taken in conjunction with the accompanying drawings.

DETAILED DESCRIPTION OF THE PREFERRED EMBODIMENT

Figure 1:
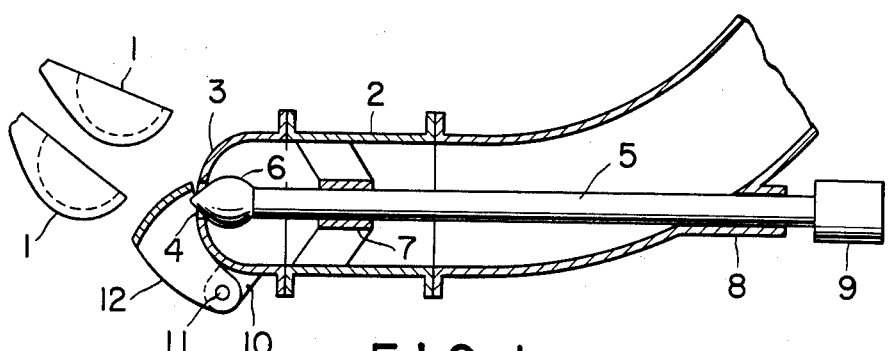
FIG. 1 is a fragmentary side view in longitudinal section showing buckets of a Pelton wheel, a nozzle mechanism and a deflector to which a deflector actuating mechanism in accordance with the present invention is applied.

FIG. 1 shows two of the several buckets of a Pelton wheel, a nozzle mechanism, and a deflector to which a deflector actuating mechanism in accordance with the present invention is applied. Reference numeral 1 designates one of the buckets of the Pelton wheel runner. The nozzle mechanism for ejecting a water jet against the buckets 1 has a nozzle pipe 2 with a nozzle tip 3 securely joined to the discharge or forward end thereof. A nozzle orifice 4 is formed at the forward end of the nozzle tip 3. A needle stem 5 is extended through the nozzle pipe 2 in such a way that the needle stem 5 can be reciprocated along the axis of the nozzle pipe 2. The forward end of the needle stem 5, that is, a needle valve 6 can be moved into and out of the nozzle orifice 4, thereby controlling the water jet. The needle stem 5 is slideably supported by bearings 7 and 8 so as to be reciprocated in the axial direction by a fluid operated servomotor 9. A deflector 12 is fixedly carried by a deflector shaft 11, which in turn is pivotally supported by a bracket 10 attached to a portion of the nozzle tip 3.

The deflector 12 is moved between a fully closed or deflecting position in which the deflector 12 covers the nozzle orifice 4 and an opened position in which the deflector 12 is withdrawn out of the flow of the water jet emerging from the nozzle orifice 4 by a deflector actuating mechanism to be described in detail hereinafter.

Figure 2:
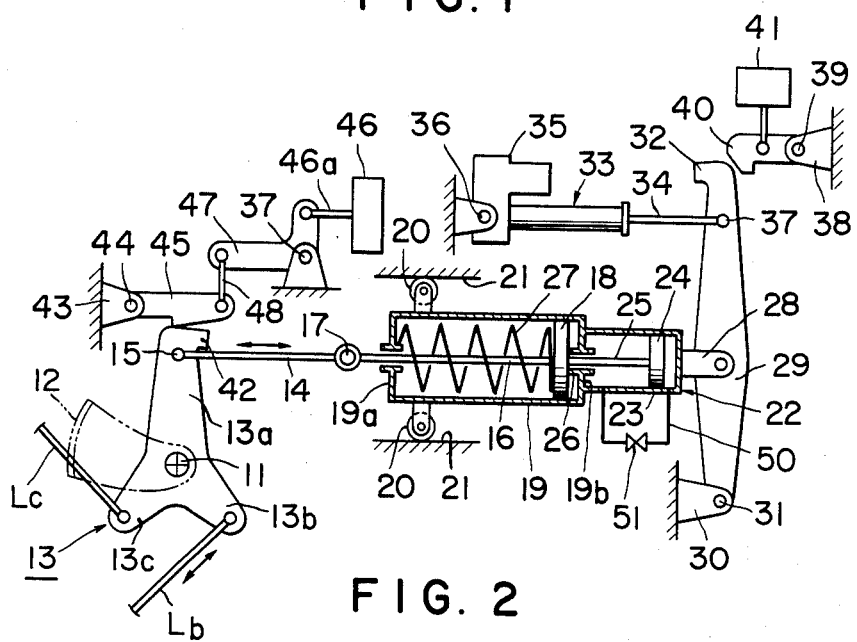
FIG. 2 is a schematic view showing a preferred embodiment of the mechanism for actuating a deflector of a Pelton wheel in accordance with the present invention.

FIG. 2 shows schematically a preferred embodiment of the mechanism for actuating a deflector in accordance with the present invention. An inverted Y-shaped deflector arm 13 is fixedly carried by one end of the deflector shaft 11 and comprises a first arm 13a on which is exerted an operating force, a second arm 13b and a third arm 13c for transmitting a force which causes other deflectors to open or close through link rods Lb and Lc.

One end of a first operating rod 14 is pivotally connected by a pin 15 to the distal or outer end of the first arm 13a, while the other end thereof is pivotally connected by a pin 17 to one end of a second operating rod 16. A spring bearing or retaining plate 18 is fixedly and coaxially joined to the other end of the second operating rod 16 and is slideably disposed within a cylinder 19. A guide roller 20 is rollably attached to the outer cylindrical surface of the cylinder 19 and is adapted to roll on a stationary guide surface 21. End plates 19a and 19b are joined to and close opposite ends of the cylinder 19, and a dash pot 22 is coaxially joined to the outer surface of the end plate 19b.

The dash pot 22 comprises a dash pot cylinder 23 and a piston 24 slideably disposed in the cylinder 23. The piston 24 and the spring bearing plate 18 in the cylinder 19 are interconnected to each other through a connecting rod 25. A stopper 26 is fixed to the end plate 19b at a portion thereof through which the connecting rod 25 is extended.

A coil spring 27 for closing the deflector 12 is loaded between the forward end plate 19a and the spring bearing plate 18 within the cylinder 19.

A connecting member 28 which is extended from the end wall remote from the deflector arm 13 of the dash pot 22 is pivotally connected by a pin to the midpoint between the ends of a swinging lever 29, whose one end is pivoted by a pin 31 to a supporting bracket 30, and whose other end is formed into an engaging portion 32. The swinging lever 29 is caused to swing about the pin 31 by an electric servomotor 33 of a conventional type available on the market.

Figure 3:
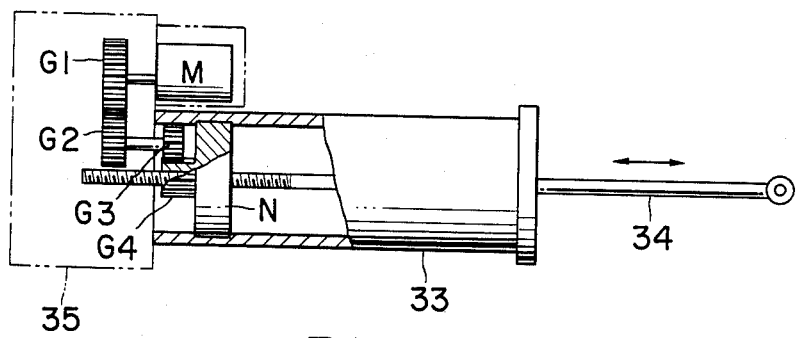
FIG. 3 is a side view, in longitudinal section, showing schematically the essential construction of an electric servomotor used in the deflector actuating mechanism.

As shown in FIG. 3, this servomotor 33 comprises a screw rod 34 and a driving mechanism 35 for imparting reciprocating motion to the screw rod 34. The driving mechanism 35 comprises an electric motor M, power transmitting gears G1, G2 and G3, and a combination of a gear G4 and a nut N integrally and coaxially joined thereto and screw engaged with the screw rod 34. When the nut N is rotated, translational movement in the axial direction is imparted to the screw rod 34. The rear end of the casing of the driving mechanism 35 is pivotally supported by a pin 36, and the outer end of the screw rod 34 is pin connected by a pin 37 to the swing lever 29 at a part thereof near its engaging portion 32.

The engaging portion 32 at one end of the swinging lever 29 is adapted to engage with a first hook 40 which is pivotally supported through a pin 39 on a bracket 38. When an electromagnetic solenoid 41 is energized, the first hook 40 is released and is engaged with the engaging portion 32 by the force of a return spring. The first hook 40 and the electromagnetic solenoid 41 constitute a first engaging means.

An engaging portion 42 is extended from the distal or outer end of the first arm 13a of the deflector arm 13 and is adapted to engage with a second hook 45, which is pivotally supported through a pin 44 on a bracket 43. The second hook 45 is actuated by an electromagnetic solenoid 46. The outer end of the plunger 46a of the solenoid 46 is pin connected to one end of a bell crank lever 47, whose other end is pin connected to the second hook 45 through a connecting rod 48. The second hook 45, the electric solenoid 46, and the bell crank arm 47 constitute a second engaging means.

Figure 4:
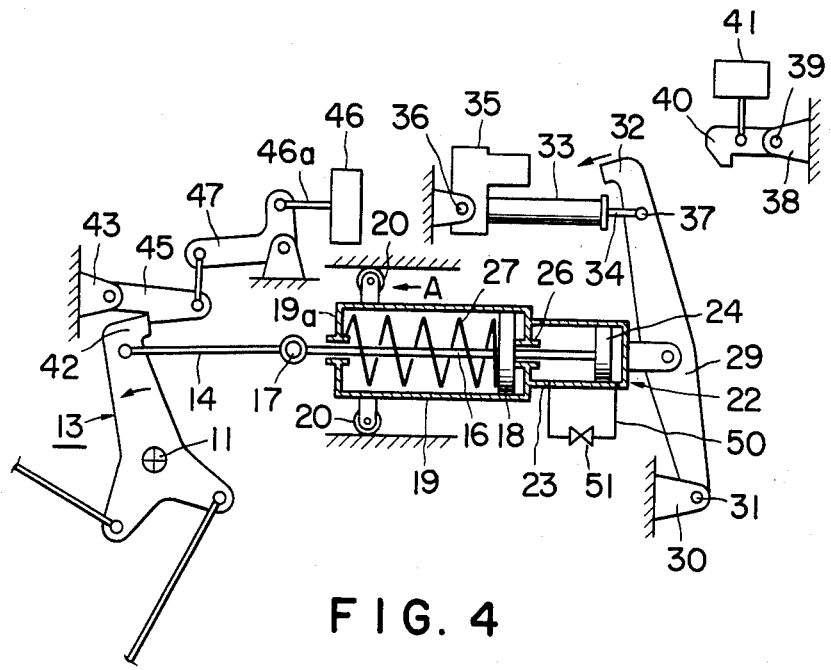
FIGS. 4, 5 and 6 are schematic views similar to FIG. 2 indicating various states of the deflector actuating mechanism in the operation thereof, in which FIG. 4 indicates the state of the mechanism for maintaining the deflector in the opened position, FIG. 5 the state wherein a coil spring is energized by compressing, and FIG. 6 the state wherein the deflector is maintained in the fully closed or deflecting position.
Figure 5:
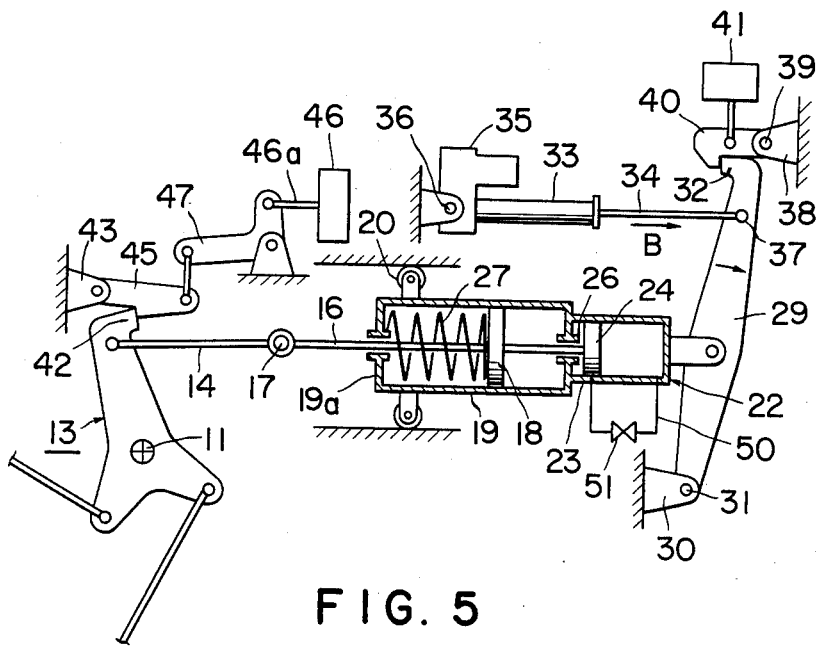
Figure 6:
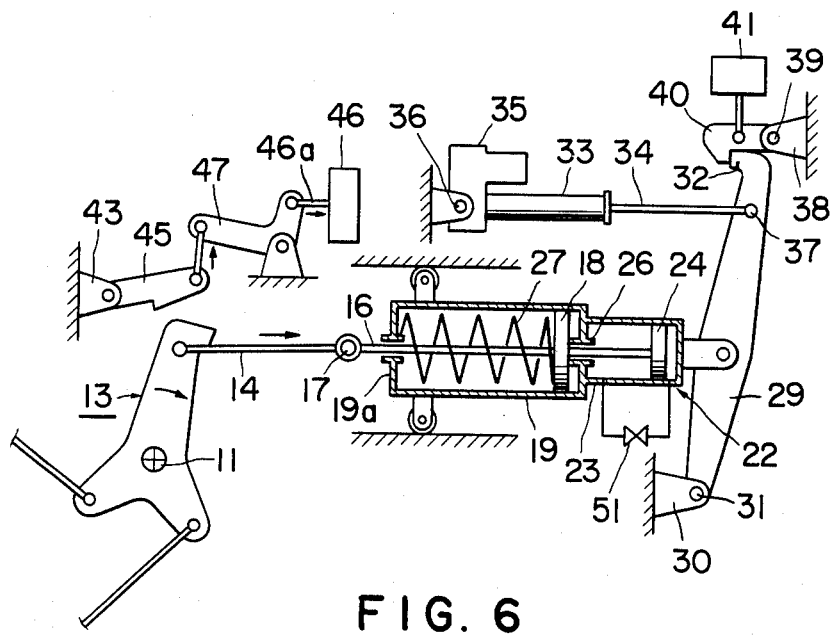

Referring next to FIGS. 4, 5 and 6, the mode of operation of the deflector actuating mechanism of the above-described construction will now be described in detail.

In order to hold the deflector 12 at the released or open position, the electromagnetic solenoid 41 is energized so that the first hook 40 is caused to move upwardly as shown in FIG. 4. Then the first hook 40 is disengaged from the engaging portion 32 at the upper end of the swinging lever 29, and the screw rod 34 of the electric servomotor 33 is retracted so that the swinging lever 29 is caused to rotate in the counterclockwise direction in FIG. 4. Therefore the cylinder 19 is guided by the guide rollers 20 to move in the direction indicated by an arrow A so that the first and second operating rods 14 and 16 are also caused to move in the direction indicated by the arrow A, thereby causing the deflector arm 13 to rotate in the counterclockwise direction. The rotation of the deflector arm 13 is transmitted through the deflector shaft 11 to the deflector 12 so that the latter is displaced to the open position. When the deflector 12 reaches the open position, a return spring (not shown) in the electromagnetic solenoid 46 causes the bell crank arm 47 to rotate in the counterclockwise direction so that the second hook 45 is placed into engagement with the engaging portion 42 of the first arm 13a of the deflector arm 13.

Next the electric servomotor 33 is energized so that the screw rod 34 is extended in the direction indicated by an arrow B in FIG. 5. As a result, the swinging lever 29 is caused to rotate in the clockwise direction so that the engaging portion 32 of the swinging lever 29 is placed into engagement with the first hook 40, whereby the swinging lever 29 is locked. In this case, since the deflector arm 13 is in engagement with the second hook 45, the first and second operating rods 14 and 16 and the spring bearing plate 18 remain stationary, but because of the rotation in the clockwise direction of the swinging lever 29, only the cylinder 19 and the dash pot cylinder 23 are caused to move to the right. As a result, the coil spring 27 interposed between the end plate 19a on the side of the deflector arm 13 and the spring bearing plate 18 is compressed within the cylinder 19, whereby energy is stored in the coil spring 27.

Normally the Pelton wheel rotates while the deflector 12 is maintained in the open position and the coil spring 27 is compressed to store energy as described above.

When the deflector 12 must be rapidly moved to the closed position because of interruption of the load on the main machine driven by the Pelton wheel while the Pelton wheel is rotating, the electromagnetic solenoid 46 is energized so as to cause the bell crank arm 47 to rotate in the clockwise direction as shown in FIG. 6. Consequently the second hook 45 is swung upward to its releasing position so that it is disengaged from the deflector arm 13 which has been maintained in the open position. Therefore the energy stored in the compressed coil spring 27 between the end plate 19a and the spring bearing plate 18 is released to apply force to the first and second operating rods 14 and 16. As a result, the first and second operating rods 14 and 16 are shifted to the right in FIG. 6, whereby the deflector arm 13 is pulled by the first and second operating rods 14 and 16 to rotate in the clockwise direction. Consequently, the deflector shaft 11 is also caused to rotate in the clockwise direction to move the deflector 12 to the closure position.

Figure 7:
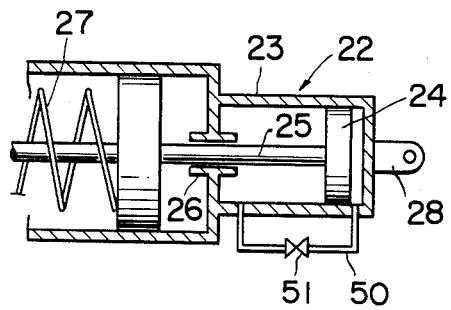
FIGS. 7 and 8 are fragmentary side views, in longitudinal section, respectively indicating operational states of a dash pot.
Figure 8:
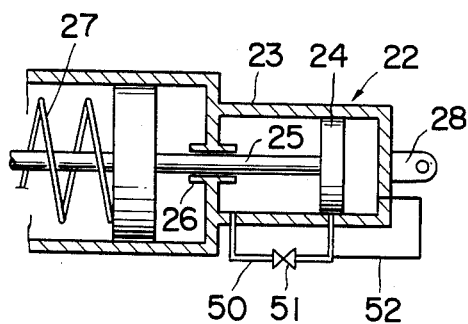

In this case, the swinging lever 29 is arrested by the first hook 40 so that the cylinder 23 of the dash pot connected to the swinging lever 29 and the cylinder 19 remain stationary, but the piston 24 is forced to move to the right in FIG. 6 within the cylinder 23 of the dash pot 22. The displacement velocity of the piston 24 can be easily controlled, for instance as shown in FIG. 7, by intercommunicating the cylinder chambers defined in front of and behind of the piston 24 through a bypass passage 50 and controlling the degree of opening of a flow control valve 51 installed in the bypass passage. Therefore, the closing velocity of the deflector 12 which rotates in unison with the deflector arm 13 can be controlled. It is preferable that the dash pot 22 be provided with a slow closure device which, when the deflector 12 is brought to a point in vicinity of the complete closure position as indicated in FIG. 8, closes a bypass passage 50 so as to cause the working oil to flow into an extremely small oil discharge pipe 52, whereby when the deflector 12 is brought to and maintained at the total closure position, exertion of excessive impact load on the stopper 26 disposed at the end plate of the cylinder is prevented.

While the deflector actuating mechanism of this invention has been described in the foregoing disclosure principally with respect to its relation to a single jet deflector, it will be obvious that the mechanism of this invention is capable of actuating a plurality of jet deflectors of a single Pelton wheel as briefly indicated hereinbefore by reference to one example wherein two additional deflectors are actuated through link rods Lb and Lc connected to the second and third arms 13b and 13c of the deflector arm 13.

What is claimed is:

1. A mechanism for actuating a deflector of a Pelton wheel comprising a deflector arm for rotating the deflector, an operating rod whose one end is pin connected to said deflector arm and whose other end carries a spring bearing plate, a cylinder in which said spring bearing plate is enclosed, and which is guided for movement in the axial direction of said operating rod, spring means which is disposed in the bore of said cylinder on the side of said operating rod and whose stored energy pulls said operating rod, a swinging lever whose one end is pivotally supported and whose midpoint is connected to one end of said cylinder, an electric servomotor connected to the free end of said swinging lever so as to cause reciprocable angular movement of said swinging lever, a first engaging means engageable with said free end of said swinging lever, thereby maintaining said swinging lever stationary, and a second engaging means for maintaining said deflector arm in the fully opened position.

2. A mechanism for actuating a deflector of a Pelton wheel as set forth in claim 1 characterized in that said deflector arm is fixed to one end of a deflector shaft for opening and closing said deflector.

3. A mechanism for actuating a deflector of a Pelton wheel as set forth in claim 1 characterized in that said operating rod comprises a first operating rod and a second operating rod which are interconnected to each other by a pin.

4. A mechanism for actuating a deflector of a Pelton wheel as set forth in claim 1 characterized in that a plurality of guide rollers are rollably mounted on the outer cylindrical surface of said cylinder and roll over stationary guide surfaces.

5. A mechanism for actuating a deflector of a Pelton wheel as set forth in claim 1 characterized in that said first engaging means comprises a hook whose one end is pivoted and whose other end terminates in an engaging portion and an electromagnetic solenoid for causing said hook to move between a locking position and an unlocking or releasing position.

6. A mechanism for actuating a deflector of a Pelton wheel as set forth in claim 1 characterized in that said second engaging means comprises a hook whose one end is pivoted and whose other end terminates in an engaging portion and an electromagnetic solenoid for causing said hook to move between a locking position and an unlocking or releasing position through a bell crank arm.

7. A mechanism for actuating a deflector of a Pelton wheel as set forth in claim 1 characterized in that said spring bearing plate is connected through a connecting rod to a dash pot piston which is disposed in a dash pot cylinder directly joined to said cylinder and pin connected to the midpoint between the ends of said swinging lever.

8. A mechanism for actuating a deflector of a Pelton wheel as set forth in claim 7 characterized in that said dash pot cylinder is communicatively connected to a bypass pipe bypassing said dash pot piston, and a flow control valve is installed in said bypass pipe.

* * * * *